UNITED STATES PATENT OFFICE.

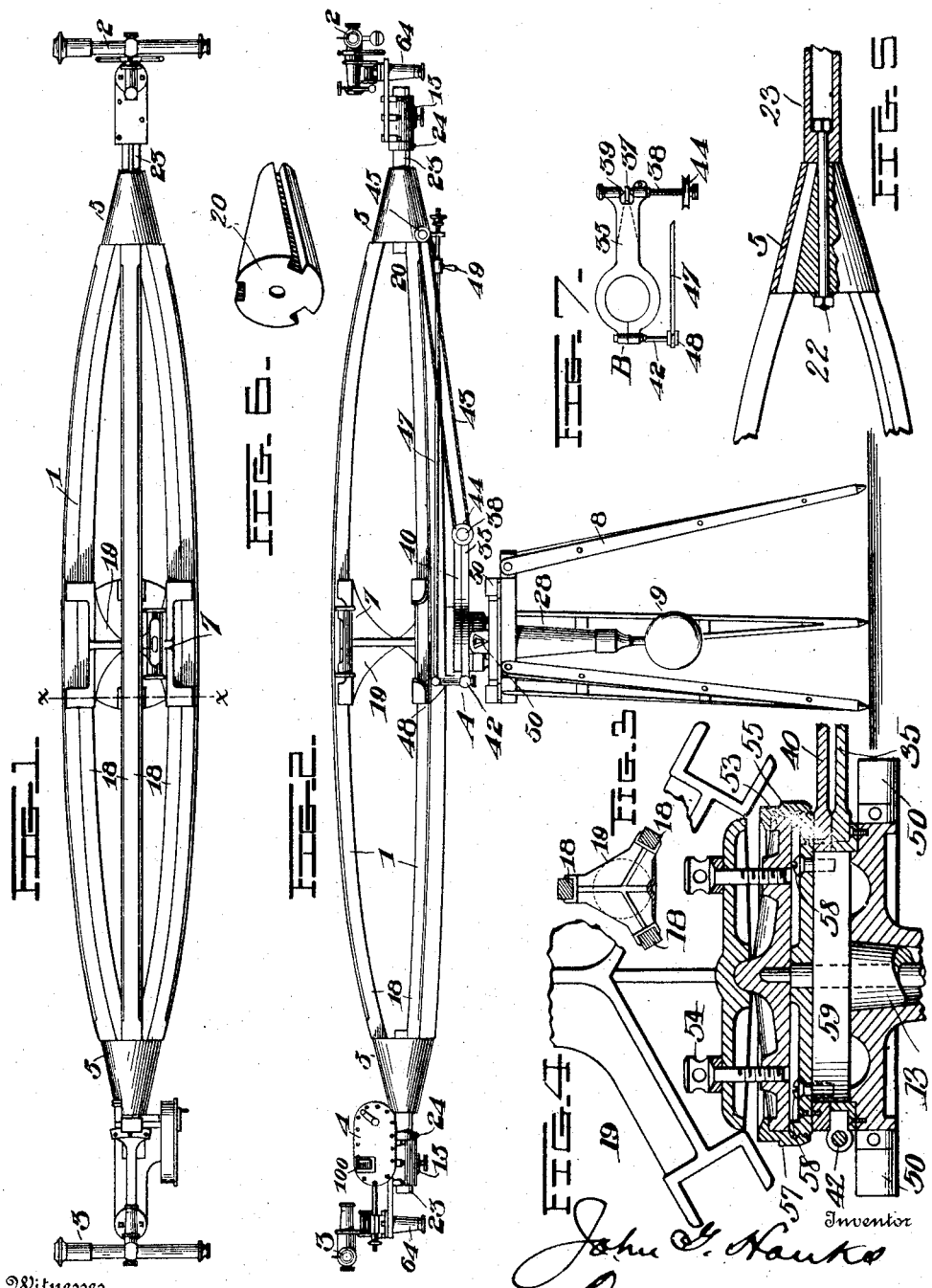

JOHN G. HANKS, OF OAKLAND, CALIFORNIA, ASSIGNOR TO CALIFORNIA RANGE FINDER COMPANY, OF OAKLAND, CALIFORNIA, A CORPORATION OF ARIZONA.

INSTRUMENT FOR MEASURING AND DETERMINING DISTANCES.

1,219,304. Specification of Letters Patent. Patented Mar. 13, 1917.

Application filed December 17, 1907. Serial No. 406,915.

*To all whom it may concern:*

Be it known that I, JOHN G. HANKS, a citizen of the United States, residing at Oakland, in the county of Alameda and State of California, have invented certain new and useful Improvements in Instruments for Measuring and Determining Distances, of which the following is a specification.

My invention relates to improvements in measuring instruments, and consists in mounting on a swiveling and adjustable beam of peculiar construction, two telescopes; one fixed in respect to the beam, with its focal line at a right angle to the axis thereof and the other telescope mounted on a swiveling vertical spindle and adjustable in a horizontal plane and in respect to the beam, by a sector, tangent screw and graduated indicating scales calibrated to read for degrees of revolution of the tangent screw and movement of the telescope, such scales or readings therefrom being directly translatable into distance or to the point of intersection of the visual lines of the telescopes without computation or the exercise of skilled knowledge.

The object of my invention is to construct the above beam in such a manner as to suitably and substantially support the telescopes in relation to each other that they may be properly and accurately manipulated.

Figure 1 is a plan view of a long base beam and its connected parts of one of my improved distance measuring instruments—Fig. 2 is a side elevation of one of my improved distance measuring instruments, mounted on a tripod, the beam resting on gimbal bearings and provided with a pendulous weight to keep it in a horizontal position—Fig. 3 is a cross section taken through the base or main beam on the line $x$—$x$ in Fig. 1—

Fig. 4, is an enlarged vertical section through the beam pivot and support when mounted as in Fig. 2.

Fig. 5 is an enlarged longitudinal section through one of the sockets at the end of the beam in Figs. 1 and 2, showing the manner of connecting the metal and wooden plates together.

Fig. 6 is a view in perspective of the conical member shown in Fig. 5, and

Fig. 7 is a plan view of the adjusting mechanism looking from the bottom.

The base or beam (1), hereinafter called the beam, when of considerable length and adapted for measuring long distances is composed of scantlings (18) of fir wood, such as is found by experiment to be least susceptible to change by climatic conditions. The beam is preferably composed of three bars (18) disposed in a triangle about the axis as shown in Fig. 3.

At the middle of the beam these bars (18) are securely held by a metal frame (19) to which the pivotal supports for the beam are attached and at the ends are held in the tapering metallic sockets (5) clamped by the conical followers (20), forced in by the screw bolts (22) as shown in Fig. 5.

Attached to these sockets (5) by the bolts (22) are extensions (23) of modified triangular section as shown in Fig. 4 and on these extensions (23) are fitted the sleeves (15) on which the telescopes (2) and (3) are mounted as seen in Fig. 2.

These sleeve (15) are adjusted on the extensions (23), equally each way from the pivotal center of the beam (1) until the telescopes (2) and (3) are separated a predetermined distance, called the base, usually a certain number of feet depending upon the range or distance over which measurements are to be made, the length of beam (1) being arranged accordingly.

This distance between the centers of the telescopes when once determined or chosen is preserved by means of the collars (24) or by any suitable device that will accurately register or determine the position of the sleeves (15) in case they are to be removed and replaced. The length of the beam (1) is modified to suit various uses of the instrument, usually from five to twenty feet, separate and interchangeable; different beams being provided with the instrument when it is to employed for varying distances.

The means for adjusting the beam preferably consist of the devices shown in Figs. 2 and 7 consisting of a cord or band (43) that passes around a grooved pulley (44) on the screw (38) and a similar pulley (45) on a stud near the end of the beam, so the screw (38) can be turned from that point and the beam (1) slightly adjusted in a horizontal plane when an attendant is adjusting the telescope (2).

To loosen the clamp (35) so the beam (1) can be turned freely about its vertical axis there is provided a sliding rod (47) attached to a crank or lever (48) on the screw (42), so that by means of a handle (49) the rod (47) can be moved either way and the screw (42) be turned a sufficient distance to nip or loosen the clamp (35) when an attendant is at the end of the beam (1) or from either of the telescopes (2) or (3); when required, these devices are dual, extending each way from the center.

When the instrument is to be employed on shipboard the main beam pivot is arranged as shown in Figs. 2 and 4, the central frame (19) being attached to a plate (53) by screws (54). The plate (53) is secured to a second plate (55) by a follower ring (57) and the whole attached to the top flange (59) of the spindle (13) by screws (58) as shown in Fig. 4.

The socket part (28) is mounted on gimbal supports (50) as seen in Fig. 2 or in the manner of a mariner's compass so that vertical deviation of the tripod (8'), or other support on which the instrument is mounted, will not be communicated to the beam (1), a pendulous weight (9) being suspended on the socket part (28) acting to keep the beam (1) in a horizontal position.

The gimbal frames (50) consisting of pivots in two planes are of the common construction and being well understood do not require detail description here.

In case of oscillating motion of the weight (9) when a ship is rolling, this can be prevented by any of the usual devices to prevent rythmic oscillation in such cases, not illustrated here because not forming a part of my present invention.

The register of the movement of the telescope (3) is observed through an aperture (100) in the casing (4) as seen in Fig. 2, and is recorded in tables of reference when the instrument is experimentally calibrated, such record being carefully preserved for future use so that distances can be accurately determined therefrom so long as the instrument remains in true adjustment.

In the case of moving objects such as vessels; after their distance has been ascertained, the movable telescope (3) can be slowly turned to coincide with the rate of their movement, and by comparing the arc described by the arm (8) with a period of time, the rate can be computed, the direction or angle of the object's movement being known or assumed.

Having thus described the nature and objects of my invention and the manner of applying the same in practice, what I claim as new and desire to secure by Letters Patent is:—

1. A measuring instrument comprising a beam composed of longitudinal members, a conical wedge received between the ends of the members, and a socket adapted to fit over the wedge for holding the longitudinal members thereagainst.

2. A measuring instrument comprising a beam composed of longitudinal members, a conical wedge having grooves therein, said longitudinal members converging at their ends and adapted to be received in the grooves, and a socket adapted to fit over the wedge for holding the longitudinal members in the grooves.

3. A measuring instrument, comprising a beam consisting of a plurality of members, a support inserted between the centers of the members and against which the latter bear, the ends of the members being caused to converge, and means embracing the latter and holding them together in opposition to the resistance of the central support.

4. A measuring instrument, comprising a beam consisting of a plurality of members, a support inserted between the centers of the members and against which the latter bear, the ends of the members being caused to converge, means embracing the latter and holding them together in opposition to the resistance of the central support, and means connected with the support to form a horizontal bearing whereby the entire beam is pivoted on its center.

5. A measuring instrument, comprising a beam consisting of a plurality of members, a support inserted between the centers of the members and against which the latter bear, the ends of the members being caused to converge, means embracing the latter and holding them together in opposition to the resistance of the central support, extensions, and means connected with the ends of the members for clamping the extensions thereto.

6. A measuring instrument, comprising a beam consisting of a plurality of members, a support inserted between the centers of the members and against which the latter bear, the ends of the members being caused to converge, means embracing the latter and holding them together in opposition to the resistance of the central support, extensions, means connected with the ends of the members for clamping the extensions thereto.

7. A range finder, comprising a beam, consisting of a plurality of members, means for holding the members apart at the center, spacing means between the ends of the members, and clamping means for holding the ends of the members in tight embrace against said spacing means, and exerting inward pressure thereagainst in opposition to the resistance of the central means and said clamping means.

8. A range finder, comprising a beam consisting of a plurality of members, means for holding the members apart at the center, spacing means between the ends of the members, clamping means for holding the ends of the members in tight embrace against said spacing means, and exerting inward pressure thereagainst in opposition to the resistance of the central means and end clamping means, extensions, and means extending through the end means and extensions for holding the latter centrally connected with the ends of the members.

In testimony whereof I affix my signature in presence of two witnesses.

JOHN G. HANKS.

Witnesses:
 ASA V. MENDENHALL,
 G. W. LAUGAN.